United States Patent
Wang et al.

(10) Patent No.: US 10,919,048 B2
(45) Date of Patent: Feb. 16, 2021

(54) REAGENT SCHEME FOR SEDIMENTARY PHOSPHATE FLOTATION

(71) Applicant: Arr-Maz Products, L.P., Mulberry, FL (US)

(72) Inventors: Guoxin Wang, Lakeland, FL (US); Yu Xiong, Lakeland, FL (US); Zhengxing Gu, Mulberry, FL (US)

(73) Assignee: ARR-MAZ PRODUCTS, L.P., Mulberry, FL (US)

( * ) Notice: Subject to any disclaimer, the term of this patent is extended or adjusted under 35 U.S.C. 154(b) by 192 days.

(21) Appl. No.: 16/176,410

(22) Filed: Oct. 31, 2018

(65) Prior Publication Data

US 2019/0126291 A1    May 2, 2019

Related U.S. Application Data

(60) Provisional application No. 62/580,854, filed on Nov. 2, 2017.

(51) Int. Cl.

| | | |
|---|---|---|
| *B03D 1/02* | (2006.01) | |
| *B03D 1/006* | (2006.01) | |
| *C01B 25/32* | (2006.01) | |
| *B03D 1/008* | (2006.01) | |

(52) U.S. Cl.
CPC ............ *B03D 1/021* (2013.01); *B03D 1/006* (2013.01); *B03D 1/008* (2013.01); *C01B 25/32* (2013.01); *C01B 25/327* (2013.01); *B03D 2201/02* (2013.01)

(58) Field of Classification Search
CPC .................................................. B03D 1/021
See application file for complete search history.

(56) References Cited

U.S. PATENT DOCUMENTS

| | | | |
|---|---|---|---|
| 3,913,742 A | 10/1975 | Laapas | |
| 4,330,398 A | 5/1982 | Alford | |
| 5,314,073 A * | 5/1994 | Sharma | ............... B03D 1/016 209/166 |
| 5,542,545 A | 8/1996 | Yu | |
| 5,962,828 A | 10/1999 | Hughes | |
| 6,994,786 B2 | 2/2006 | Cameron et al. | |
| 2003/0121833 A1 | 7/2003 | Sotillo | |
| 2005/0269248 A1 | 12/2005 | Cameron | |
| 2013/0284642 A1* | 10/2013 | Teague | ............... B03D 1/021 209/3.1 |

FOREIGN PATENT DOCUMENTS

WO      2016025165      2/2016

OTHER PUBLICATIONS

Korean Intellectual Property Office; International Search Report and Written Opinion; dated Mar. 27, 2019; published May 9, 2019 under Pub. No. WO 2019/089927.

* cited by examiner

*Primary Examiner* — Melissa S Swain
(74) *Attorney, Agent, or Firm* — Head, Johnson, Kachigian & Wilkinson, PC

(57) ABSTRACT

A process of phosphate flotation comprising: pulping phosphate ore with water to about 55% to 75% solids to produce an ore slurry; conditioning the ore slurry with a new reagent scheme to produce a conditioned slurry; subjecting the conditioned slurry to flotation to produce an underflow and an overflow; and collecting the overflow as phosphate concentrate. The new reagent scheme may comprise a combination of fatty acid, fuel oil, and fatty acid soap, and may not comprise a pH modifier. The process may also work effectively at a lower percent solids than conventional reagent schemes.

6 Claims, No Drawings

REAGENT SCHEME FOR SEDIMENTARY PHOSPHATE FLOTATION

CROSS REFERENCE

This application is based on and claims priority to U.S. Provisional Patent Application No. 62/580,854 filed Nov. 2, 2017.

BACKGROUND OF THE INVENTION

Field of the Invention

This invention relates generally to a process of froth flotation, and more particularly, but not by way of limitation, to a sedimentary phosphate flotation process utilizing a new scheme of flotation reagent combinations.

Description of the Related Art

Phosphate rock typically consists of calcium phosphate, largely in the form of apatite, together with clay, quartz, and other non-valuable minerals, and is used in fertilizers and as a source of phosphorus compounds. Froth flotation is the most widely used industrial process for the separation of finely divided minerals in phosphate ores.

The process typically begins by obtaining an appropriately sized flotation feed with a typical grade of 3% to 10% $P_2O_5$ through logging, washing, desliming, and sizing. The feed is typically a thick slurry that is traditionally conditioned with a pH modifier, fatty acids (FA), fuel oil (FO), and other co-collectors at a pH of 8.5 to 10.

The most widely used flotation reagents/collectors are unsaturated fatty acids, such as oleic acid, and the technical grades or commercial grades of naturally-occurring fatty acid mixtures having a high proportion of unsaturated fatty acids derived from such oils as tall oil, corn oil, safflower oil, soybean oil, cottonseed oil, and linseed oil; sulfonated fatty acids; animal based fatty acids such as tallow fatty acid and derivatives thereof; as well as synthetic acids. The flotation effect of the fatty acids is usually enhanced by mixing in a certain amount of a petroleum based hydrocarbon, such as diesel oil, #5 fuel oil, or reclaimed oil, which sometimes contains a small amount of a nonionic or anionic emulsifier. The most commonly used pH modifiers for alkaline flotation are caustic soda, soda ash (SA), ammonia, and formulated pH modifiers. Depressant such as sodium silicate and/or causticized starch is sometime used for improving flotation selectivity. The conventional reagent scheme can be simplified as FA/FO+pH Modifier+Depressant or Pre-saponified FA/FO+Depressant. These reagent schemes operate in a pH range of 8.5 to 10.

According to a commonly used process, the incoming mineral feed must be exposed to some means of size fraction control, where clays and oversized fractions are removed, as well as possibly generating different sized flotation feeds. Two flotation processes are often required: the flotation of phosphate with an anionic type collector, followed by a process where the remaining undesired silica minerals are floated away from a phosphate concentrate product with an amine collector to a targeted grade. Some of the most used collectors, such as fatty acids and their derivatives, are thought to be effective collectors for oxidized mineral ores. However, selectivity, and thus the grade of the desired minerals in the concentrates, is a major challenge associated with the recovery of alkaline flotation.

Based on the foregoing, it is desirable to provide a phosphate flotation reagent scheme that can be used at lower pH than the use of traditional FA/FO or saponified FA/FO alone, namely at a pH of 7 to 8, thus eliminating the necessity of pH modifiers.

It is further desirable to provide a phosphate flotation reagent scheme that allows lower percent solids at conditioning and/or for flotation than the use of traditional FA/FO or saponified FA/FO alone.

It is further desirable for this scheme to result in increased recovery of phosphate while improving selectivity, and thus the grade of the phosphate concentrate.

SUMMARY OF THE INVENTION

In general, in a first aspect, the invention relates to a process of phosphate flotation comprising: pulping phosphate ore with water to about 55% to 75% solids to produce an ore slurry; conditioning the ore slurry with a reagent scheme to produce a conditioned slurry, where the reagent scheme comprises a combination of fatty acid, fuel oil, and fatty acid soap and does not comprise a pH modifier; subjecting the conditioned slurry to flotation to produce an underflow and an overflow; and collecting the overflow as phosphate concentrate.

The conditioning step may take place at a pH of 7 to 8. The pH of the ore slurry and the pH of the conditioned slurry may not be modified with a pH modifier.

The process may further comprise diluting the conditioned slurry with plant water prior to flotation. The flotation step may be the only flotation performed prior to collecting the phosphate concentrate. The process may not comprise a second flotation step. The reagent scheme may not comprise a depressant for flotation selectivity.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a process of sedimentary phosphate flotation using a reagent scheme that combines fatty acid (FA) and fuel oil (FO) with fatty acid soap. The reagent scheme is designed for beneficiating sedimentary phosphate ores containing majorly siliceous mineral impurities.

The reagent scheme may comprise a combination of an oil-based fatty acid collector and fatty acid soap. It may not include a pH modifier. In particular, it may explicitly exclude caustic soda, soda ash, ammonia, and other acids that can increase pH. The ratio of oil-based fatty acids and fatty acid soap may vary from 1:99 to 99:1, or more particularly 10:90 to 90:10. The fatty acid may be conventional fatty acid or modified fatty acid. The fatty acid may be unsaturated fatty acids, such as oleic acid, or the technical grades or commercial grades of naturally-occurring fatty acid mixtures having a high proportion of unsaturated fatty acids derived from such oils as tall oil, corn oil, safflower oil, soybean oil, cottonseed oil, and linseed oil; sulfonated fatty acids; animal based fatty acids such as tallow fatty acid and derivatives thereof; as well as synthetic acids. The fuel oil may be diesel oil, #5 fuel oil, or reclaimed oil, which sometimes contains a small amount of a nonionic or anionic emulsifier.

The flotation feed may be a regular flotation feed prepared by conventional washing and sizing. In particular, the ore may be pulped with water to about 55% to 75% solids. The resulting ore slurry may then be conditioned with the reagent scheme of the present invention at neutral pH, namely a pH of approximately 7 to 8. This conditioning may occur without use of a pH modifier. The conditioned slurry may then be diluted and floated. The underflow may be discarded as siliceous impurities, while the float may be collected as phosphate concentrate.

This scheme may render metallurgical advantages for sedimentary phosphate floatation over conventional reagent schemes of FA/FO under alkaline pH or pre-saponified FA/FO. In particular, this scheme may allow a similar or higher grade P2O5 concentrate with much higher P2O5 recovery; single stage flotation to achieve targeted P2O5 concentrate instead of the two stage flotation currently commonly utilized, especially for coarse fraction feeds; a pH of 7 to 8 for conditioning and flotation; elimination of the pH modifier; possible elimination of the depressant used to improve flotation selectivity; better tolerance on plant water quality and the variance of conditioning solids; and better savings and safety factors for the industry. The practice of this flotation process may result in increased recovery of phosphate while improving selectivity, and thus the grade of the phosphate concentrate.

EXAMPLES

In the foregoing examples, the effectiveness of the reagent scheme was tested with five different flotation feed samples: fine Feeds A, B, C, and D (106 to 500 micron) and coarse Feed E (500 to 710 micron), collected from different flotation plants. In order for those skilled in the art to be better understood how the present invention can be performed, the following examples are given by way of illustration only, and not necessarily by way of limitation. It should be noted that Example I, II and III are given in the manner of comparative examples, in which they illustrate the results of the conventional reagent schemes of FA/FO under alkaline pH.

Example I

Feed A (106 to 500 micron) was conditioned at a slurry density of 70% solids at predetermined pH 9.3 using a conventional reagent scheme with soda ash as a pH modifier and at neutral pH using the new reagent scheme without pH modifier for two minutes. Specifically, the conventional reagent scheme was 0.5 to 0.9 lb oil-based fatty acid Reagent A per ton feed plus 0.3 to 0.6 lb/t-feed FO plus 0.51 to 0.63 lb/t-feed soda ash as pH modifier, while the new reagent scheme was 0.6 lb oil-based Reagent A per ton feed plus 0.4 lb/t-feed FO plus 0.85 to 1.7 lb/t-feed FA soap Reagent B.

After conditioning, the slurry was diluted to about 30% solids and floated. The underflow of the flotation was discarded as siliceous impurities while the float was collected as concentrate. The flotation results are shown in Table I.

TABLE I

| Reagent A | FO | Reagent B | SA | | FEED | CONC. | | TAIL | | Recovery |
|---|---|---|---|---|---|---|---|---|---|---|
| lb/t | lb/t | lb/t | lb/t | pH | % BPL | % BPL | Wt (%) | % BPL | Wt (%) | % |
| 0.49 | 0.33 | | 0.51 | 9.3 | 10.23 | 55.82 | 11.41 | 4.36 | 88.59 | 62.25 |
| 0.60 | 0.40 | | 0.57 | 9.3 | 10.18 | 54.96 | 13.13 | 3.41 | 86.87 | 70.89 |
| 0.69 | 0.46 | | 0.57 | 9.3 | 10.22 | 52.08 | 17.54 | 1.32 | 82.46 | 89.35 |
| 0.80 | 0.53 | | 0.57 | 9.3 | 10.35 | 50.26 | 18.13 | 1.51 | 81.87 | 88.06 |
| 0.90 | 0.60 | | 0.63 | 9.3 | 10.06 | 46.90 | 19.85 | 0.94 | 80.15 | 92.51 |
| 0.60 | 0.40 | 0.85 | | | 10.16 | 55.38 | 14.75 | 2.34 | 85.25 | 80.37 |
| 0.60 | 0.40 | 0.99 | | | 10.18 | 54.16 | 15.67 | 2.01 | 84.33 | 83.35 |
| 0.60 | 0.40 | 1.14 | | | 9.81 | 51.54 | 16.59 | 1.51 | 83.41 | 87.16 |
| 0.60 | 0.40 | 1.43 | | | 9.81 | 49.25 | 17.96 | 1.18 | 82.04 | 90.14 |
| 0.60 | 0.40 | 1.70 | | | 9.82 | 47.12 | 19.22 | 0.95 | 80.78 | 92.19 |

This example shows a similar concentration grade with better recovery achieved with the new reagent scheme as compared to the conventional reagent scheme.

Example II

Feed B (106 to 500 micron) was conditioned at a slurry density of about 65% solids at predetermined pH 9.3 using a conventional reagent scheme with ammonia as a pH modifier and at neutral pH using the new reagent scheme without pH modifier for two minutes. Specifically, the conventional reagent scheme was 0.4 to 1.0 lb oil-based Reagent C per ton feed plus 0.17 to 0.44 lb/t-feed diesel oil plus 1.74 to 2.80 lb/t-feed ammonia as pH modifier, while the new reagent scheme was 0.4 to 0.8 lb oil-based Reagent C per ton feed plus 0.18 to 0.34 lb/t-feed diesel oil plus 2.84 lb/t-feed fatty acid soap Reagent D.

After conditioning, the slurry was diluted to about 30% solids and floated. Plant water was used in this example. The underflow of the flotation was discarded as siliceous impurities while the float was collected as concentrate. The flotation results are shown in Table II.

TABLE II

| Reagent C lb/t | DO lb/t | Reagent D lb/t | Ammonia lb/t | pH | FEED % BPL | CONC. % BPL | CONC. Wt. (%) | TAIL % BPL | TAIL Wt. (%) | Recovery % |
|---|---|---|---|---|---|---|---|---|---|---|
| 0.40 | 0.17 |  | 1.74 | 9.3 | 19.17 | 66.70 | 10.84 | 13.39 | 89.16 | 37.73 |
| 0.60 | 0.26 |  | 2.05 | 9.3 | 18.70 | 63.62 | 21.81 | 6.17 | 78.19 | 74.20 |
| 0.77 | 0.33 |  | 2.13 | 9.3 | 18.93 | 59.65 | 25.80 | 4.77 | 74.20 | 81.30 |
| 1.00 | 0.43 |  | 2.80 | 9.3 | 18.71 | 56.13 | 30.85 | 2.01 | 69.15 | 92.57 |
| 0.40 | 0.17 | 2.84 |  |  | 19.28 | 55.46 | 32.59 | 1.79 | 67.41 | 93.74 |
| 0.60 | 0.26 | 2.85 |  |  | 19.06 | 56.19 | 31.84 | 1.72 | 68.16 | 93.85 |
| 0.80 | 0.34 | 2.84 |  |  | 19.09 | 55.23 | 32.58 | 1.62 | 67.42 | 94.28 |

This example shows that the new reagent scheme, FA/DO plus Reagent D, is much stronger than the conventional reagent scheme, FA/DO plus ammonia. The addition of Reagent D may significantly improve flotation performance, allowing a potential 40% to 50% reduction on FA dosage, with no ammonia as pH modifier needed.

Example III

Feed C (106 to 500 micron) was conditioned at a slurry density of 55% to 70% solids at predetermined pH 9.3 using a conventional reagent scheme with ammonia as a pH modifier and at neutral pH using the new reagent scheme without pH modifier for two minutes. Specifically, the conventional reagent scheme was 0.61 lb oil-based Reagent C per ton feed plus 0.26 lb/t-feed diesel oil plus 3.08 to 3.87 lb/t-feed ammonia as pH modifier, while the new reagent scheme was 0.61 lb oil-based Reagent C per ton feed plus 0.61 lb/t-feed diesel oil plus 2.9 lb/t-feed fatty acid soap Reagent D.

After conditioning, the slurry was diluted to about 30% solids and floated. Plant water was used in this example. The underflow of the flotation was discarded as siliceous impurities while the float was collected as concentrate. The flotation results are shown in Table III.

TABLE III

| Reagent C lb/t | DO lb/t | Reagent D lb/t | Ammonia lb/t | pH | FEED % BPL | CONC. % BPL | CONC. Wt. (%) | TAIL % BPL | TAIL Wt. (%) | Recovery % | Conditioning solids |
|---|---|---|---|---|---|---|---|---|---|---|---|
| 0.61 | 0.26 |  | 3.87 | 9.3 | 9.27 | 52.60 | 9.23 | 4.86 | 90.77 | 52.40 | 55% |
| 0.61 | 0.26 |  | 3.72 | 9.3 | 9.57 | 52.32 | 15.29 | 1.85 | 84.71 | 83.62 | 60% |
| 0.61 | 0.26 |  | 3.24 | 9.3 | 9.79 | 51.99 | 15.75 | 1.90 | 84.25 | 83.65 | 65% |
| 0.61 | 0.26 |  | 3.08 | 9.3 | 9.71 | 45.65 | 19.79 | 0.84 | 80.21 | 93.06 | 70% |
| 0.61 | 0.26 | 2.9 |  |  | 9.34 | 44.02 | 15.66 | 2.90 | 84.34 | 73.81 | 55% |
| 0.61 | 0.26 | 2.9 |  |  | 9.45 | 40.65 | 20.40 | 1.46 | 79.60 | 87.71 | 60% |
| 0.61 | 0.26 | 2.9 |  |  | 9.34 | 35.70 | 24.71 | 0.68 | 75.29 | 94.52 | 65% |
| 0.61 | 0.26 | 2.9 |  |  | 9.47 | 33.29 | 27.22 | 0.56 | 72.78 | 95.70 | 70% |

This example shows that lower condition solids produce poorer flotation performance. The new reagent scheme, however, is more tolerant on the variances of condition solids, and thus generated better results than the conventional reagent scheme, even at low condition solids such as 55%.

Example IV

Feed D (106 to 500 micron) was conditioned at a slurry density of 70% solids at neutral pH using a conventional reagent scheme and using the new reagent scheme for two minutes. Specifically, the conventional reagent scheme was 0.58 to 1.14 lb/t-feed fatty acid soap Reagent E plus 0.12 to 0.23 lb/t-feed FO, while the new reagent scheme was 0.58 to 0.86 lb/t-feed Reagent E plus 0.12 to 0.23 lb/t-feed FO plus 0.17 to 0.35 lb/t-feed oil-based Reagent A.

After conditioning, the slurry was diluted to about 30% solids and floated. Plant water was used in this example. The underflow of the flotation was discarded as siliceous impurities while the float was collected as concentrate. The flotation results are shown in Table IV.

TABLE IV

| Reagent E lb/t | FO lb/t | Reagent A lb/t | FEED % BPL | CONC. % BPL | CONC. Wt. (%) | TAIL % BPL | TAIL Wt. (%) | Recovery % |
|---|---|---|---|---|---|---|---|---|
| 0.58 | 0.12 | 0.00 | 12.69 | 63.69 | 10.98 | 6.40 | 89.02 | 55.10 |
| 0.86 | 0.17 | 0.00 | 13.05 | 54.70 | 21.78 | 1.46 | 78.22 | 91.25 |
| 1.14 | 0.23 | 0.00 | 13.06 | 51.42 | 23.97 | 0.97 | 76.03 | 94.35 |
| 0.58 | 0.12 | 0.17 | 13.06 | 55.43 | 21.62 | 1.37 | 78.38 | 91.77 |
| 0.58 | 0.23 | 0.35 | 13.10 | 53.22 | 23.01 | 1.11 | 76.99 | 93.48 |
| 0.86 | 0.23 | 0.34 | 13.07 | 50.45 | 24.74 | 0.78 | 75.26 | 95.51 |

This example shows that the new reagent scheme is much stronger than the conventional reagent scheme of pre-saponified FA plus FO.

Example V

Coarse Feed E (500 to 710 micron) was conditioned at a slurry density of 70% solids at predetermined pH 9.3 using a conventional reagent scheme with soda ash as a pH modifier and at neutral pH using the new reagent scheme without pH modifier for two minutes. Specifically, the conventional reagent scheme was 0.34 to 0.85 lb Reagent A per ton feed plus 0.23 to 0.57 lb/t fuel oil plus 0.48 to 0.66 lb/t-feed soda ash as pH modifier, while the new reagent scheme was 0.3 lb/t-feed Reagent A plus 0.2 lb/t fuel oil plus 0.85 to 1.7 lb/t-feed Reagent E.

After conditioning, the slurry was diluted to about 30% solids and floated. The underflow of the flotation was discarded as siliceous impurities while the float was collected as concentrate. The flotation results are shown in Table V.

TABLE V

| Reagent A lb/t | FO lb/t | Reagent E lb/t | SA lb/t | pH | FEED % BPL | CONC. % BPL | CONC. Wt (%) | TAIL % BPL | TAIL Wt (%) | Recovery % |
|---|---|---|---|---|---|---|---|---|---|---|
| 0.34 | 0.23 | | 0.48 | 9.3 | 19.95 | 61.28 | 30.18 | 2.08 | 69.82 | 92.72 |
| 0.51 | 0.34 | | 0.54 | 9.3 | 19.54 | 50.13 | 37.33 | 1.31 | 62.67 | 95.80 |
| 0.68 | 0.45 | | 0.60 | 9.3 | 19.75 | 41.18 | 46.48 | 1.14 | 53.52 | 96.91 |
| 0.85 | 0.57 | | 0.66 | 9.3 | 19.11 | 38.53 | 48.31 | 0.96 | 51.69 | 97.40 |
| 0.34 | 0.23 | 0.85 | | | 19.49 | 68.69 | 26.89 | 1.39 | 73.11 | 94.79 |
| 0.34 | 0.23 | 1.14 | | | 19.44 | 68.20 | 27.33 | 1.11 | 72.67 | 95.85 |
| 0.34 | 0.23 | 1.43 | | | 19.46 | 67.82 | 27.78 | 0.86 | 72.22 | 96.81 |
| 0.34 | 0.23 | 1.70 | | | 19.38 | 66.24 | 28.44 | 0.76 | 71.56 | 97.19 |

This example shows that the selectivity of the new reagent scheme is much better than the conventional reagent scheme with similar or better recovery for the coarse feed. A good concentrate grade, greater than 68.69%, and a good recovery, greater than 94%, can be obtained as final phosphate concentrate. With the new reagent scheme, amine flotation may be eliminated. A potential 40% to 50% reduction in FA dosage may be possible with the new reagent scheme.

Whereas, the devices and methods have been described in relation to the drawings and claims, it should be understood that other and further modifications, apart from those shown or suggested herein, may be made within the spirit and scope of this invention.

What is claimed is:

1. A process of phosphate flotation comprising:
   pulping phosphate ore with water to about 55% to 75% solids to produce an ore slurry;
   conditioning the ore slurry with a reagent scheme to produce a conditioned slurry, where the reagent scheme comprises a combination of fatty acid, fuel oil, and fatty acid soap and does not comprise a pH modifier and where the pH of the ore slurry and the pH of the conditioned slurry are not modified with a pH modifier;
   subjecting the conditioned slurry to flotation to produce an underflow and an overflow; and
   collecting the overflow as phosphate concentrate.

2. The process of claim 1 where the conditioning step takes place at a pH of 7 to 8.

3. The process of claim 1 further comprising diluting the conditioned slurry with plant water prior to flotation.

4. The process of claim 1 where the flotation step is the only flotation performed prior to collecting the phosphate concentrate for coarse flotation feed.

5. The process of claim 1 where the process does not comprise a second flotation step for coarse flotation feed.

6. The process of claim 1 where the reagent scheme does not comprise a depressant to improve flotation selectivity.

\* \* \* \* \*